US008549502B2

(12) United States Patent
Husbands (10) Patent No.: US 8,549,502 B2
(45) Date of Patent: Oct. 1, 2013

(54) COMPILER WITH USER-DEFINED TYPE INFERENCE RULES

(75) Inventor: Parry Jones Reginald Husbands, Waltham, MA (US)

(73) Assignee: Microsoft Corporation, Redmond, WA (US)

( * ) Notice: Subject to any disclaimer, the term of this patent is extended or adjusted under 35 U.S.C. 154(b) by 512 days.

(21) Appl. No.: 12/819,400

(22) Filed: Jun. 21, 2010

(65) Prior Publication Data

US 2011/0314459 A1    Dec. 22, 2011

(51) Int. Cl.
*G06F 9/45* (2006.01)

(52) U.S. Cl.
USPC ........... 717/151; 717/141; 717/143; 717/145; 717/148

(58) Field of Classification Search
USPC .......................... 717/145, 154, 141, 143, 148
See application file for complete search history.

(56) References Cited

U.S. PATENT DOCUMENTS

| | | | | |
|---|---|---|---|---|
| 5,253,189 | A * | 10/1993 | Kramer | 703/7 |
| 5,301,260 | A | 4/1994 | Miyashita | |
| 6,014,518 | A * | 1/2000 | Steensgaard | 717/154 |
| 6,041,179 | A * | 3/2000 | Bacon et al. | 717/116 |
| 7,426,503 | B2 | 9/2008 | Baras | |
| 7,730,079 | B2 * | 6/2010 | Meijer et al. | 707/760 |
| 8,245,210 | B2 * | 8/2012 | Ng et al. | 717/153 |
| 2005/0044542 | A1 * | 2/2005 | Grimaud et al. | 717/174 |
| 2006/0048095 | A1 * | 3/2006 | Meijer et al. | 717/114 |
| 2007/0050347 | A1 * | 3/2007 | Johannes Maria Meijer et al. | 707/4 |
| 2007/0245325 | A1 * | 10/2007 | Lapounov et al. | 717/140 |
| 2008/0262992 | A1 * | 10/2008 | Meijer et al. | 706/52 |
| 2009/0031291 | A1 | 1/2009 | Adams | |

OTHER PUBLICATIONS

Yu et al., "Fast and Memory-Efficient Regular Expression Matching for Deep Packet Inspection", May 22, 2006.*
Tony Stubblebine, "Regular Expressions for Perl, C, PHP, Python, Java, and .NET", 2007.*
When to Exploit Type Inference in Haskell?—Published Date: 2009 http://stackoverflow.com/guestions/463870/when-to-exploit-type-inference-in-haskell.
The Necessity of Type Inference—Published Date: 2008 http://guidewiredevelopment.wordpress.com/2008/07/15/the-necessity-of-type-inference.
Type Arithmetic—Retrieved Date: Apr. 15, 2010 http://okmij.org/ftp/Computation/type-arithmetics.html.
MONC—A Matlab Language .NET Compiler—Retrieved Date: Apr. 15, 2010 http://www.monc.eu/Tech.aspx.
Relaxed Dependency Analysis—Retrieved Date: Apr. 15, 2010 http://hackage.haskell.org/trac/haskell-prime/wiki/Relaxed-DependencyAnalysis.

* cited by examiner

*Primary Examiner* — Phillip H Nguyen (57) ABSTRACT

Performance of a program written in dynamic languages is improved through the use of a compiler that provides type inference for methods having a user-defined element. The user-defined element may be an input in a user-defined type. Though, the user-defined element may reflect that the method is user-defined. Type inference may be performed based on a user-defined mapping, relating input types to output types for one or more methods. The mapping may be specified as a data table provided to the compiler or as one or more functions that register with the compiler such that, as the compiler processes portions of a source program and detects a method with a user-defined element, the compiler may access the mapping and infer the type of an output of the method. The inferred type may then be used to optimize code dependent on that output.

20 Claims, 7 Drawing Sheets

COMPILER WITH USER-DEFINED TYPE INFERENCE RULES

BACKGROUND

Today, many devices are controlled by software. To support the development of software for such a wide array of devices, many programming languages have been developed. Programming languages support constructs that allow users to write a program in a format that is understandable to a person. Programs in this format are said to be in "source code" form. A compiler is used to convert a program in source code form into a form in which it can be executed by a computer.

Each programming language may include features that make it easy for a user to write programs. These features allow a user to express in a small number of high level instructions what could be potentially a very large number of computations or manipulations that a computer is to perform when the software is executed.

In some cases, a programming language may be object-oriented. Such a language allows a user to define objects. Using objects allows an overall program to be segregated into logical pieces that a programmer, or group of programmers, can conveniently develop. In addition, the overall program can be created by specifying interactions between the objects, which, because the objects can be defined based on logical elements meaningful to a human programmer, is also likely to be convenient for a human programmer.

Each object may have methods and properties. The methods represent operations, sometimes called functions or procedures, that can be used to interact with the object. The properties define states or identities associated with the object in an execution environment.

Some programming languages also support "types." As a program is developed, any element that may take on a value during execution of the program may be given a type. For example, when a variable that is intended to represent a numeric quantity is declared, it may be assigned a type appropriate for the type of number it is to represent. The use of types can help a compiler efficiently store and operate on values. For example, the compiler can specify a simpler sequence of instructions to perform mathematical operations on variables that are declared to be integers or natural numbers than the same operations that are performed on variables that could be floating point numbers. Moreover, a compiler may allocate less storage space for a variable declared to have an integer type than for a variable declared to be a floating point number.

While having typing can lead to more efficient programs, it can limit flexibility for programmers. Dynamic languages are intended to simplify the development of programs. Rather than requiring a programmer to declare a type of each variable, in a dynamic language, the compiler determines the types of variables based on how they are used. To support this capability, a compiler for a dynamic language may contain type inference rules for types that are defined as part of the dynamic language. As the compiler processes objects in a source program that generate values, it applies the type inference rules to determine the appropriate type for representing the generated value.

SUMMARY

The inventor has recognized and appreciated that a dynamic language may be improved by providing the ability for the compiler to perform type inferences, based on user-supplied assertions, in connection with user-defined elements. This capability may be provided by a compiler that accepts assertions in the form of a user-defined mapping between one or more input types and one or more output types associated with an operation involving one or more user-defined elements.

The user-defined element may be the result of a method call with an input variable of a user-defined type. In this scenario, the mapping may specify, for each of multiple methods, a type of a result or types of results returned by the method. The mapping may contain information that allows the compiler to infer the types of the outputs based on the type associated with each of the members in each of multiple sets of inputs to the method. Each set may contain one or more user-defined types.

Another example of a user-defined element may be a user-defined method. In this scenario, the mapping may specify a type of a result or types of results returned by the method. The mapping may similarly contain information to allow the compiler to infer a type for each of one or more outputs of the method based on the types associated with a set of inputs.

In some embodiments, the mapping may be external to the compiler and may be specified in a table that acts as an input to the compiler. Such a mapping may be generated by user input or may be augmented by the compiler or other program that analyzes source code to identify type relationships. In other embodiments, the mapping may be specified through functions that register with or otherwise be made available to the compiler, which may also be user-generated or based on automated recognition of type relationships.

The type inferences may be used to efficiently generate code that depends on one or more outputs of the method with a user-defined element. In some scenarios, the generated code may include a component to detect and/or correct an error in code generated based on the type inference, if the type inference is found to be incorrect.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Ease of programming and program efficiency may both be achieved with a compiler for a dynamic language that can perform type inference for methods that have a user-defined element. A method may be regarded as having a user-defined element because one or more inputs are in a type that has been user-defined. Though, the method may also be regarded as having a user-defined element if the method has itself been user-defined.

In this context, it should be appreciated that "user-defined" implies an aspect of a programming language that is not defined as part of the dynamic language but is, instead, specified during application of the dynamic language. A user-defined aspect may be defined based on express user input, which may be entered into a file or other data store using editing or authoring tools as are known in the art of software development. Though, it should be appreciated that the user-definition need not be expressly authored by a user. For example, the definition may be provided by a user or even an automated tool copying or downloading information from a source external to the compiler, but which is then made available to the compiler.

To support type inference involving user-defined elements, a compiler for a dynamic language may include an interface through which it accesses information used in making a type inference. That information may be represented in a mapping, and the compiler may include an interface through which it can access the mapping. Any suitable form of interface may be used to access a mapping, and the specific form of interface used may depend on the representation of the mapping.

Figure 1:
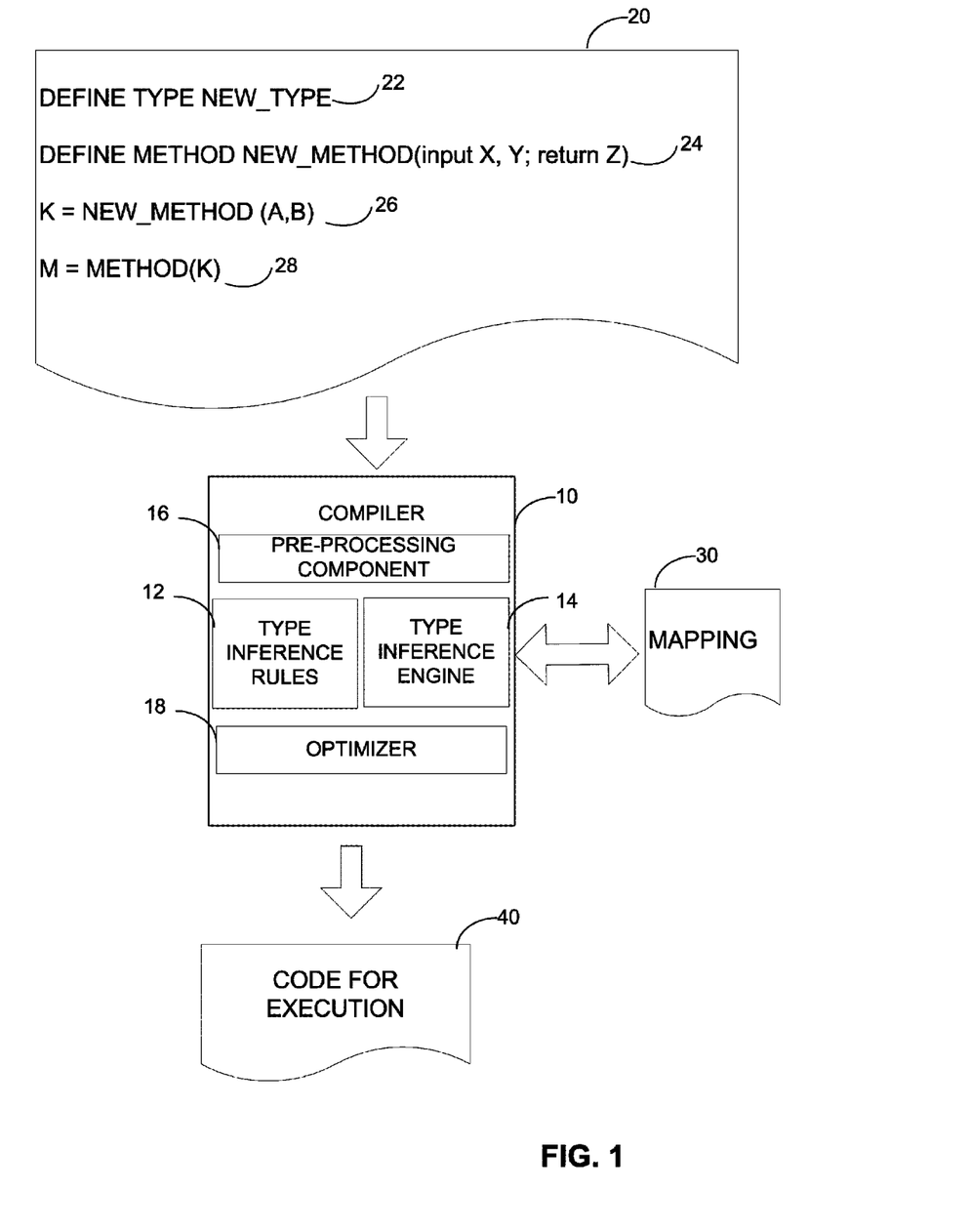
FIG. 1 is schematic illustration of an environment in which a compiler that supports type inferences involving methods with user-defined elements may operate.

FIG. 1 illustrates an example of a compiler 10 for a dynamic language that accesses such a mapping 30. In operation, compiler 10 may access a source program 20, process source program 20 and generate code for execution 40. Such a compiler may exist in a program development environment. Though, it is not a requirement of the invention that the compiler be used only during development. It is known, for example, that a source program may be conditionally or partially compiled in a development environment. In an execution environment, as the sections of the program that are to be executed are identified based on runtime conditions, the compilation may be completed or un-compiled sections may at that time be compiled. Embodiments of a compiler that supports type inference with user-defined elements may exist in a development environment, a runtime environment or in any other suitable environment. Accordingly, it should be appreciated that compiler 10 may execute on any suitable computing device or combination of computing devices.

Compiler 10 may be implemented using techniques as are known in the art for implementing compilers for dynamic languages. Compiler 10 may be implemented as computer-executable instructions that execute on any suitable processor or processors. These computer-executable instructions may perform functions as are known in the art for a dynamic compiler. For example, compiler 10 may obtain portions of source code 30 and process each one to generate code in an executable format.

Additionally, compiler 10 may include type inference rules 12 that support type inferences involving types supported by the dynamic language. Compiler 10 may include elements that determine when each of such type inference rules are applicable when processing portions of source code 20 and then appropriately apply the type inference rules. Accordingly, as compiler 10 processes source code 20, compiler 10 may encounter a method that generates as an output a value. By appropriate selection and application of a rule form type inference rules 12, compiler 10 can determine the type of the output.

To support type inferences for user-defined elements, compiler 10 may include type inference engine 14. Type inference engine 14 may be a portion of compiler 10. Though, may not initially be configured to process any specific user-defined elements. Rather, type inference engine 14 may include an interface through which it may access mapping 30. Mapping 30 may contain user-defined information that type inference engine 14 may apply to perform type inferences where a user-defined element is present.

Type inference engine 14 may be implemented in any suitable way. In the embodiment illustrated, it may be implemented as computer executable code that executes on one or more processors. That code may be configured to receive a portion of a source code 20 involving a user-defined element. Inference engine 14 may then access mapping 30 to infer type. In the scenario in which the portion of the source code invokes a method with one or more inputs, inference engine 14 may identify the types of the inputs and access mapping to determine the types of outputs of the method for the specified type of inputs.

To determine whether a portion of a program for which a type is to be inferred should be processed with pre-defined type inference rules 12 or a user-defined mapping 30 in type inference engine 14, compiler 10 may include pre-processing component 16. Pre-processing component may perform functions as are known in the art. Those functions may include identifying portions of source program 20 that can be processed at one time. In addition, pre-processing component may identify portions of program 20 for which type inference is desirable.

In contrast to a conventional component of a compiler, pre-processing component, upon detecting a portion of program 20 for which type inference is desirable, may determine whether that type inference should be performed with type inference rules 12 or in type inference engine 14. That determination may be based on whether the portion involves a user-defined element. If so, pre-processing component may direct the portion to type inference engine 14. If not, pre-processing component may direct the portion for processing with type inference rules 12.

As a specific example, if pre-processing component detects a method call in a portion of source code 20 being processed, pre-processing component may check the types of the inputs to the method. If one or more of the variables has a type that is user-defined, pre-processing component may deem that type inference is to be performed in type inference engine 14. Conversely, if all of the input variables are of predefined types, pre-processing component may deem that type inference is to be performed in type inference rules 12.

Pre-processing component may determine the type of input variables in any suitable way. One approach for identifying a user-defined element associated with a portion of source program 20 is to apply information generated in processing other portions of program 20. In some embodiments, compiler 10 may maintain a table or other suitable structure of variables and their types. Variables may be added to the table as pre-processing component encounters the variables in processing portions of source program 20. The types for the variables may be added as they are inferred. Though, as an example of another approach, variable declarations or other user input associated with a program may be used to detect variables of user-defined types.

Alternatively or additionally, pre-processing component may identify a portion of source program 20 that has a user-defined element by detecting portions that invoke user-defined methods. In such an embodiment, type inference engine 14 may infer the type of one or more outputs of the method.

Regardless of the criteria used by pre-processing component to identify portions of source program 20 for which type inference is to be performed and to identify those portions that have a user-defined element, pre-processing component may direct portions of source program 20 for processing by type inference rules 12 or type inference engine 14, as appropriate.

Regardless of how the type inference is performed, compiler 10 may use the inferred type in any of one or more ways. As in a conventional compiler, compiler 10 may use the inferred type to determine the type or types of other variables of the program. As compiler 10 generates executable code involving manipulation of these variables, it may use the information about type to optimize the generated code in one or more respects. Accordingly, FIG. 1 shows type inferences provided by either type inference rules 12 or type inference engine 14 are provided to optimizer 18.

Optimizer 18 may be implemented using techniques as are known in the art. Optimizer 18 may perform optimizations based on predefined types that are part of the dynamic language as well as user-defined types. For example, type information may be used to select an amount of memory allocated to store a value for a variable. Alternatively or additionally, compiler 10 may omit or simplify instructions included in the generated code for checking for errors or exception conditions. Though, it should be appreciated that any suitable optimization techniques, whether now known or hereafter developed, may be applied by compiler 10 based on the implied type of one or more variables.

Once optimized, or otherwise processed, the generated code may be used as in a conventional system. This use may include loading the code in an execution environment where it may be executed.

In the example of FIG. 1, source program 20 is shown with instructions through which a user defines types. For example, instruction 22 illustrates an instruction that a user may include in source code for a program to define a type. In this example, instruction 22 includes a definition of the type NEW_TYPE. The type NEW_TYPE is therefore a user-defined type.

It should be appreciated that FIG. 1 provides a simplified example of a type definition. Type definition is known in the art and any suitable technique, whether now known or hereafter developed, may be used to define a type. Such a definition may include, in addition to the information shown in FIG. 1, information about the defined type, such as the structure of data or the defined type and other characteristics. This information may be stored by compiler 10 and used in processing portions of source program 20 using variables of the defined type.

The example of FIG. 1 also illustrates user-definition of a method. Instruction 24 is an example of a user definition of a method. Method definition is known in the art and any suitable technique, whether now known or hereafter developed, may be used to define a method. Such a definition may include, in addition to the information shown in instruction 24, information about the defined method, such as the number of input parameters, the number of output parameters and other characteristics. This information may be stored by compiler 10 and then used in processing portions of source program 20 using methods of the defined type.

In the example of FIG. 1, instruction 26 provides an example of use of a user-defined method. Instruction 26 is a simple example of use of a method for which a type may be inferred in type inference engine 14. Here, the method may be regarded as having a user-defined element because the method is itself user-defined.

Type inference engine 14 may determine the type of the value returned by method NEW_METHOD. That determination may be made based on the context in which NEW_METHOD is accessed in instruction 26. The set of inputs to NEW-METHOD are part of the context that may be used in type inference. In this scenario, the set of inputs to NEW_METHOD contains two variables, A and B. A and B may be variables that have been previously encountered by compiler 10 in processing source program 20. Accordingly, type inference engine 14 may consult mapping to determine a type of the output of NEW_METHOD in this context.

In instruction 26, a variable K is assigned the value returned upon execution of method NEW_METHOD. Type inference engine 14 may use the determined type of the output of NEW_METHOD to infer the type of variable K.

The type of variable K may be further used in processing other aspects of source program 20. Instruction 28, for example, invokes a method, designated METHOD, that takes as its input a value of variable K. In this example, METHOD may be a predefined method of the dynamic language that compiler 10 processes. In scenarios in which the variable K has been determined to have a type that is one of the predetermined types supported by the dynamic language, pre-processing component 16 may direct the portion of source program 20 containing the call the METHOD to type inference rules 12 for further processing to infer the type of M. Though, if the variable K was determined, based on processing in connection with instruction 26, to be a user-defined type, pre-processing component may direct the portion of source program 20 containing the call the METHOD to type inference engine 14 for further processing.

Figure 2A:
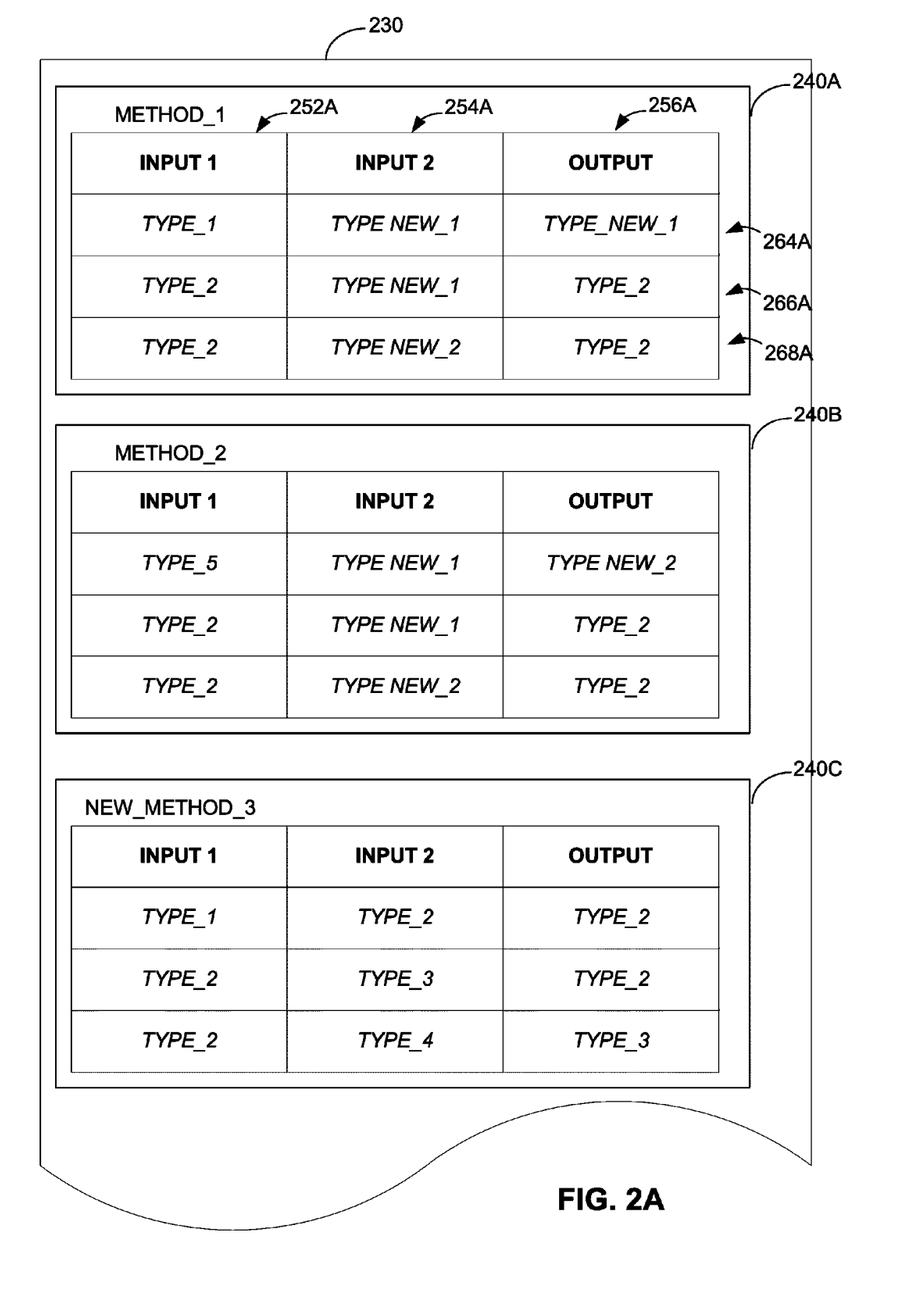
FIG. 2A is a schematic illustration of a mapping that may be used with a compiler that supports type inferences involving methods with user-defined elements.

Mapping 30, used by type inference engine 14, may be in any suitable form. Turning to FIG. 2A, an example of a suitable form is provided. In this example, a mapping 230, implemented as a collection of data tables, of which data tables 240A, 240B and 240C. Mapping 230 may contain a data table for each method that may have a user-defined element and for which type inference may be performed. In FIG. 2A, data tables are shown for each of three methods, labeled METHOD_1, METHOD_2 and NEW_METHOD_3. It should be appreciated that three methods are shown for simplicity, but that a source program may contain more than three methods that may have a user-defined element. METHOD_1 and METHOD_2 may each be methods that are part of the dynamic language of compiler 10. Nonetheless, each may regarded as having a user-defined element because each may accept within a set of inputs a variable having a user-defined type. NEW_METHOD_3 may be regarded as having a user-defined element because it is user-defined. Though, a user-defined function may also have input variables that are of a user-defined type.

The data tables 240A, 240B and 240C may be stored in any suitable computer storage medium to which type inference engine 14 has access. For example, the data tables may be stored in one or more files. Though, the specific format in which information in mapping 230 is stored is not critical to the invention.

As shown, each data table has rows and columns that define relationships between sets of inputs and sets of outputs. Each row may define a relationship for one set of input types. Taking data table 240A as illustrative, rows 264A, 266A and 268A are illustrated. In this example, the method METHOD_1, represented in data table 240A, has two inputs. Accordingly, the set of input types has two types, one for each of the inputs. The input types are indicated in each of columns 252A and 254A.

The set of output types is represented in other columns. In this example, METHOD_1 is shown to have one output, such that there is only one type value in the set of output types. That value is indicated in column 256A.

Taking row 264A as an example, a set of input types is illustrated to contain TYPE_1 and NEW_TYPE_1. When the first and second inputs to method METHOD_1 are of types TYPE_1 and NEW_TYPE_1, respectively, information on the types of the output of method are illustrated in a set of columns. In this example, METHOD_1 has only one output, so the types for the set of outputs can be represented in a single column, column 256A in this example. In this example, the value in column 256A indicates that, when the inputs are of types TYPE_1 and NEW_TYPE_1, respectively, the output of METHOD_1 is of type NEW_TYPE_1.

Data table 240A contains multiple rows, illustrated as rows 264A, 266A and 268A. Each row corresponds to a different permutation of types for the inputs to METHOD_1. A permutation is reflected by the values in columns 252A and 254A for each of the row. For example, an output type is indicated in row 266A for inputs having types TYPE_2 and NEW_TYPE_1. Similarly, an output type is indicated in row 268A for inputs having types TYPE_2 and NEW_TYPE_2.

Other similar relationships may be illustrated for other methods in other data tables. For example, table 240B illustrates a mapping between input types and output types for method METHOD_2. A similar mapping is showed for NEW_METHOD_3 in data table 240C.

The information in mapping 230 may be obtained in any suitable way. In some embodiments, for example, the information may be recorded as part of development of a program. As a specific example, this information may be generated using a traditional inference technique on the method. This information may be collected in an automated, semi-automated or even a manual process. As a programmer uses authoring tools to define methods or data types, the tools may capture information about the operation of the methods and infer the appropriate mapping. Alternatively or additionally, the authoring tools could prompt a user to generate the information as methods and types, such as by generating a data table for the user to populate with specific relationships. Though, in some embodiments, a user may simply create the spreadsheet or other representation of the appropriate relationships without any involvement from a tool.

Alternatively, the information in mapping 230 could be generated or augmented by a tool by processing a source program. Some portions of a source program may reveal a pattern of variable usage that reveals likely type relationships. In the example of source program 20, instruction 26 could be an example of a scenario in which a type of variable K is inferred. However, if the type of variable K is known when instruction 26 is executed, that instruction could be used to infer a relationship between a set of input types, specifically the types of variables A and B, and an output type, specifically the type of variable K. Such a relationship could be added as a row in a data table such that mapping 230 could be built or augmented based on information dynamically generated as the program is being compiled. Though, in instances in which type relationships are inferred in this fashion, or in other instances in which there is uncertainty in the type relationship, compiler 10 may insert error checking code into a compiled program such that a check can be made that, upon execution, a variable actually has the type that the compiler inferred that it had.

Each of the data tables in mapping 230 is shown to have the same form, with two values in the set of input types and only one value in the set of output types. Likewise, each data table is shown to contain a mapping for only three permutations of the type of input variables. It should be appreciated that this format is shown for simplicity of illustration. Different methods may have different numbers of inputs, which can be more or less than two. Similarly, different numbers of permutations of input types may be relevant for different methods. Accordingly, the specific format of the data structure used to hold mapping is not critical to the invention.

It should be appreciated that FIG. 2A illustrates a relationship that is achieved through organization of data into rows and columns. Though, any suitable organization of data may be used to show relationships. Moreover, it is not a requirement that the relationships be indicated by positioning data items in a memory. In some embodiments, the values in a mapping may be tagged with values that indicate the relationship between input and output type.

Figure 2B:
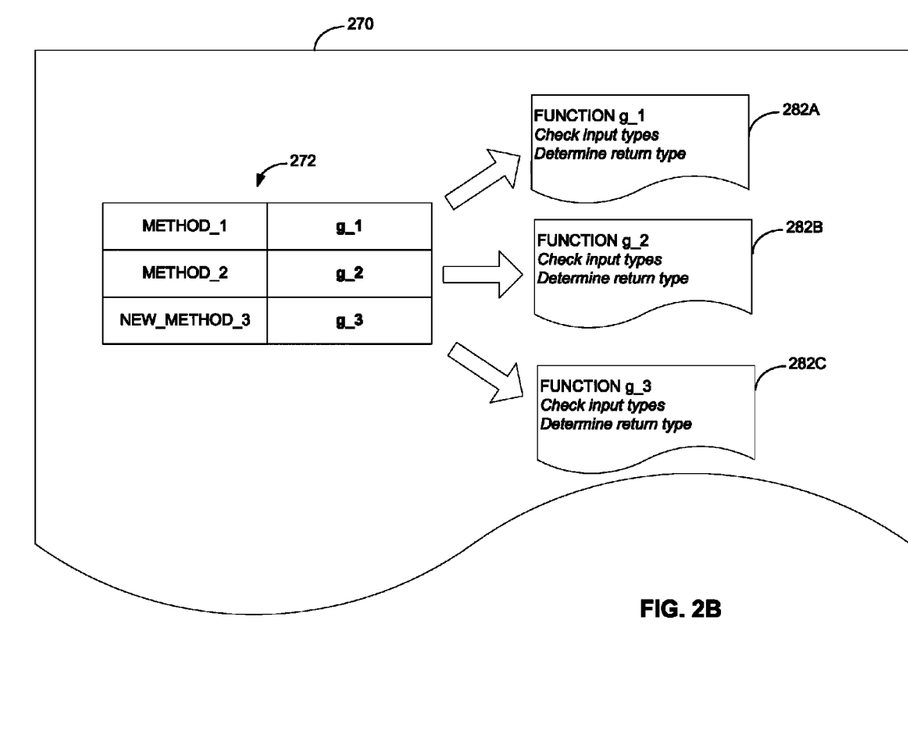
FIG. 2B is a schematic illustration of an alternative embodiment of a mapping that may be used with a compiler that supports type inferences involving methods with user-defined elements.

Accordingly, any suitable representation of a mapping may be used. FIG. 2B illustrates an example of another suitable mapping. In this embodiment, rather than indicating relationships through a data table, relationships are encapsulated into functions associated with computer-executable components that may be invoked by type inference engine 14 to make a type inference.

In the example of FIG. 2B, mapping 270 contains an index 272. Index 272 relates each method having a user-defined element and for which a type inference is to be performed may be reflected in mapping 270. Index 272 relates each such method to a function. For example, index 272 relates method METHOD_1 to function g_1, method METHOD_2 to function g_2, and method NEW_METHOD_3 to function g_3.

Each of the functions may be coded, in any suitable programming language that can be executed in an environment in which compiler 10 executes. Here, functions g_1, g_2 and g_3 are illustrated as functions 282A, 282B and 282C, respectively. Accordingly, functions g_1, g_2 and g_3 provide output type information about method METHOD_1, method METHOD_2, and method NEW_METHOD_3, respectively.

Each of functions g_1, g_2 and g_3 may be implemented as a DLL or other component containing executable code that may be invoked by type inference engine 14. When invoked, each function may take as inputs values representing a specific set of types of inputs for the corresponding method. When invoked, the function may return a set of values representing the types of the output of the corresponding method. Accordingly, to infer a type of an output of any instance of a method, type inference engine 14 may access index 272 to obtain an identifier for a corresponding function. Type inference engine 114 may then call that function, based on the identifier, supplying with the call values representing the types of the inputs to the method in that instance. Though, it should be appreciated that any suitable interface may be used between compiler 10 and mapping 270.

Also, index 272 may be constructed in any suitable way. In some embodiments, index 272 may be a static index, created as a data structure in a computer storage medium when the set of functions is developed. In other embodiments, index 272 may be dynamically constructed as compiler 10 operates. In such an embodiments, the functions, such as g_1, g_2 and g_3 may register with type inference engine 14 as they are loaded into an environment in which compiler 10 is operating. Though, it should be appreciated that any suitable interface may be used between type inference engine 14 and the associated functions.

Moreover, any suitable processing may be used within each of the functions to determine a set of output types for any set of input types. Each of the functions, for example, may be coded as a data table. Though, each function could encapsulate rules or other structures for relating a set of input types to a set of output types for a method. Accordingly, it should be appreciated that the specific format of each of the functions is not critical to the invention.

Figure 3:
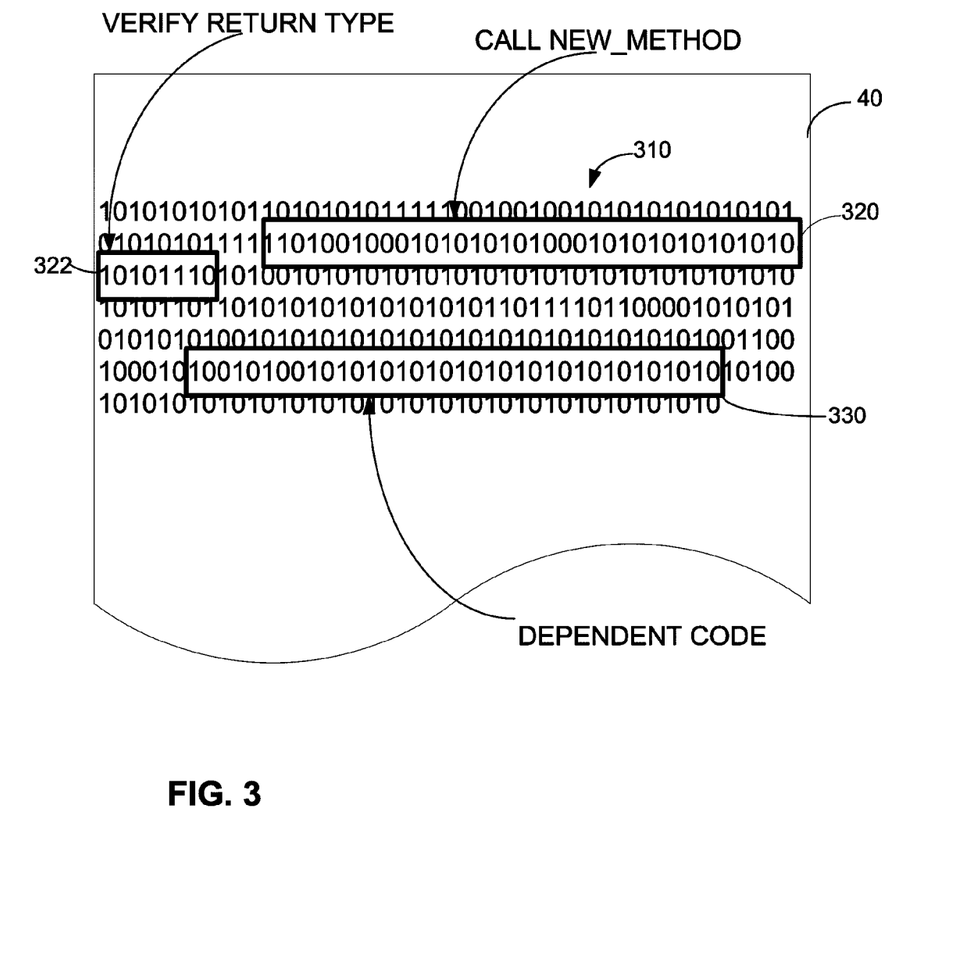
FIG. 3 is a schematic illustration of code that may be generated by the compiler of FIG. 1.

Regardless of the form of mapping 30, the mapping may be used in generating code for execution 40. FIG. 3 provides an example of the format of code for execution 40. As shown, code for execution 40 may be recorded in a suitable computer-readable medium. In this example, code for execution 40 may be recorded as multiple bits 310 that can control one or more processors to perform operations specified within source code 20.

Accordingly, groups of the bits 310 may correspond to different ones of the instructions in source code 20 and related functions inserted by compiler 10. For example group 320 may correspond to instruction 26 in which a method, NEW_METHOD, is called. Group 320 may be a group of bits in an executable file generated using techniques as are known in the art.

Similarly, group 330 of bits may correspond to instructions that are dependent on the output of NEW_METHOD. These bits, for example, may represent instruction 28. Group 330 may also be generated using techniques as are known in the art. Though, in generating group 330, optimizer 18 may optimize the code using a type inferred for a variable set equal to the output of method NEW_METHOD. In the example of FIG. 1, group 330 is generated assuming that the variable K has a type determined by type inference engine 14 based on information relating to NEW_METHOD in mapping 30.

In some embodiments, in scenarios in which an executable representation of dependent code has been generated based on an inferred type, compiler 10 may add an indication of that fact into code for execution 40. In the example of FIG. 3, that indication is represented as group 322 of bits. Group 322 may indicate, for example, may indicate that a type of a variable, such as variable K, has been inferred using user-defined information. In addition, group 322 may indicate the inferred type.

Information in group 322 of bits may allow a runtime environment executing code for execution 40 to detect a potential error as a result of using a user-defined type rule. For example, the environment may detect, when variable K is accessed, that it is accessed as if it has a type different than the implied type. In this scenario, the runtime environment may issue a warning, generate an exception or otherwise take action in response to detecting the potential inconsistency.

In some embodiments, group 322 may contain additional information that may allow the runtime environment to correct the error. For example, group 322 may contain information about portions of code for execution 40 that were generated dependent on the type inference involving NEW_METHOD. With this information, the runtime environment may alter that code to avoid the error. Dependent code, such as is represented by group of bits 330, may be replaced with new code that is generated based on the type of variable K as determined in the runtime environment. Other code that is dependent on the implied type may similarly be replaced. In embodiments in which group 320 of bits is generated based on the assumption that the output of NEW_METHOD will be of a type that, based on runtime information was an incorrect assumption, group 320 of bits may also be replaced within the runtime environment with bits that perform functions appropriate for the type of the output of NEW_METHOD.

Replacement for groups of bits in code for execution 40 may be made in any suitable way. In environments in which source programs are at least partially compiled in the runtime environment, replacement may be made by re-compiling the code with a different type assumed for the output of NEW_METHOD. Bits, representing executable instructions, generated in this fashion could be inserted into the computer readable medium containing code for execution 40 in the same place as the group of bits being replaced. Though, it should be appreciated that the replacement groups could be stored in any suitable location. Replacement could be made by the runtime environment causing the replacement bits to be executed at the time that the bits being replaced otherwise would have been executed. In this way, errors from incorrect or incomplete type inferences can be corrected. Though, it should be appreciated that any mechanism may be used to detect the possibility of an error and to correct or report such an error, once detected.

Figure 4:
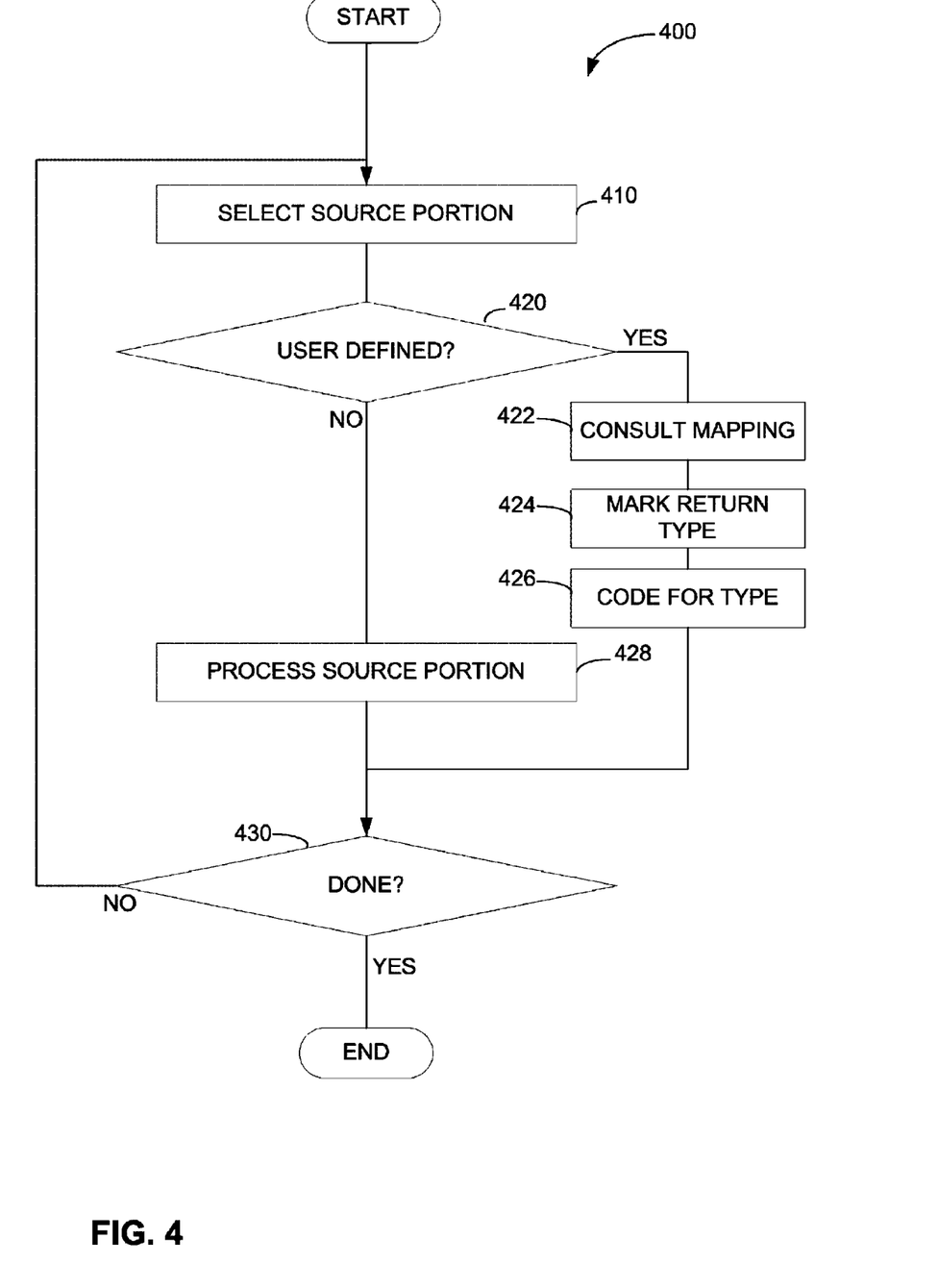
FIG. 4 is a flow chart of a process of generating code based on a type inference involving a method with a user-defined element.

Turning now to FIG. 4, a flow chart of an exemplary process of operating a compiler is illustrated. The process 400 may begin in response to user input indicating that a source program has been developed and is ready to be compiled. Though, as noted above, in some embodiments, compilation may be performed at least in part in a runtime environment based on an indication that execution of a program or a portion of a program may occur. Accordingly, an event that triggers execution of process 400 is not critical to the invention.

One the process 400 is triggered, the process may begin at block 410. At block 410, compiler 10 may select a portion of the source program for processing. The portion may be any suitable amount of the source program, such as one instruction or a block of instructions. Alternatively, smaller portions may be selected and compiler 10 may group those smaller portions into larger portions that represent instructions or related groups of instructions. Such processing of source programs is known in the art and processing at block 410 may be performed using known techniques.

Regardless of how a portion of the source program is selected at block 410, once a portion is selected, processing may proceed to decision block 420. At decision block 420, process 400 may branch, depending on the nature of the selected portion. If the selected portion represents a method call with a user-defined element, the process may branch to block 422. Conversely, if the selected portion does not represent a method call with a user-defined element, the process may branch to block 428 where the portion may be processed as in a conventional compiler, or in any other suitable way.

If the process branches to block 422, compiler 10 may consult a mapping, such as mapping 30. Information in the mapping may reveal the type of the result or results of the call to the method. This result type, or if more than one output, the result types, may be indicated in an executable file created by compiler 10 at block 424. The result of processing at block 424, for example, may be a group of bits in an executable file, such as group 322 of bits.

Processing may then proceed to block 426. At block 426, compiler 10 may generate groups of bits, representing processor-level byte code for the selected portion of source code. Those groups of bits may be generated based on the inferred type of the result. In addition, any other suitable processing, including processing as is known in the art for compilation of a dynamic language, may be performed at block 426.

Regardless of how the process branches at decision block 420, the process may reach decision block 430. The process may reach decision block 430 following execution of either block 426 or 428.

At decision block 430, the process may again branch, depending on whether more portions of the source program remain to be processed. If all portions have been processed, process 400 may then end. Conversely, if more portions remain to be processed, processing may return to block 410.

At block 410, another portion of the source program may be selected for processing, and the processing as illustrated in FIG. 4 may be repeated for that selected block When process 400 ends, the source program may be fully or partially converted into executable format. The code in executable format may then be loaded into the runtime environment where it may be executed.

Figure 5:
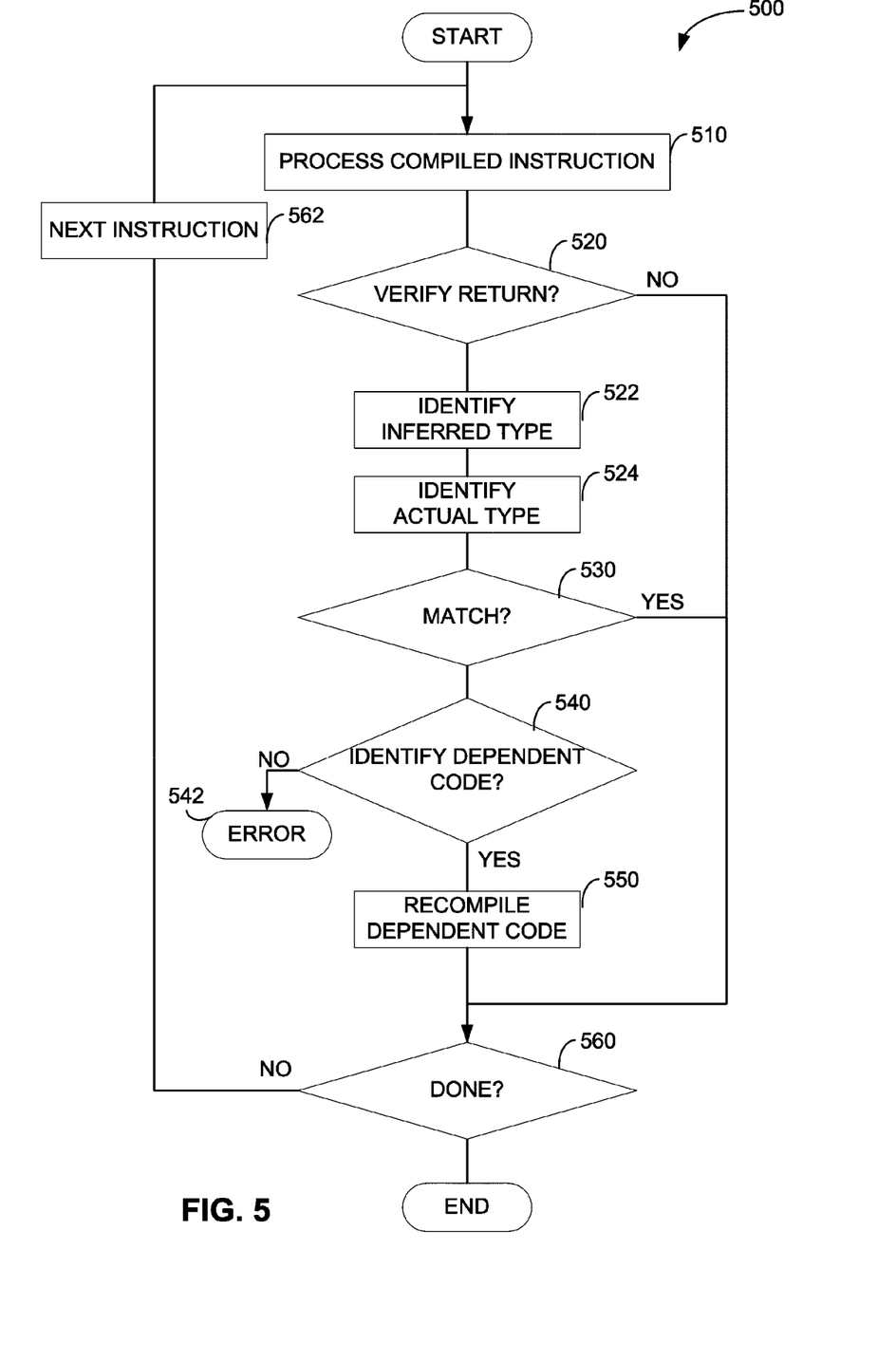
FIG. 5 is a flow chart of a process of executing code generated based on a type inference involving a method with a user-defined element.

FIG. 5 illustrates a process 500 by which that code in executable format may be executed in a runtime environment. Process 500 may begin in response to any suitable trigger, including a user providing input to indicate that the program should be executed.

Regardless of the trigger, the process may begin at block 510. At block 510, a compiled instruction may be identified and executed. Processing at block 510 may involve selection of a group of bits that represent a processor-level instruction. This processing may be performed as is known in the art or in any other suitable way.

At decision block 520, the process may branch, depending on whether the instruction executed at block 510 was a return from a method for which a return type was inferred. The processing may further depend on whether information was inserted into the compiled program to verify that the inferred type matches the types of variables found during runtime. When the instruction represents such a return for which verification of the inferred type is possible, process 500 may branch to block 522. Otherwise, the process may continue to decision block 560.

If the process branches to block 522, processing may be performed to verify that the inferred type of the result or, in cases where the method provides multiple results, the results was correct. At block 522, the inferred type may be determined. The inferred type may involve reading a group of bits embedded in or otherwise associated with the bits representing the compiled code.

At block 524, an actual type may be determined. Determining the actual type also may be done in any suitable way. For example, a runtime environment may track the type of variables that exist in the runtime environment. At block 524, the runtime environment may identify variables that are assigned a value dependent on the output of the method identified at decision block 520.

At decision block 530, the runtime environment may compare the inferred type, as determined at block 522, with the actual type, as determined at block 524. Process 500 may branch, depending on the result of this comparison. If the actual and inferred types match, process 500 may proceed to decision block 560. At decision block 560, a check may be made as to whether additional compiled byte code remains to be executed. If not, the process may terminate.

Though, if processing at decision block 530 indicates that the inferred and actual types do not match, processing may proceed to decision block 540. At decision block 540, the process may again branch, depending on whether the runtime environment can identify portions of the compiled code that depended on the inferred type. If so, the process may proceed to block 550, where the dependent code may be recompiled such that portions of the executable code generated in dependence on the inferred type are replaced. In connection with replacing the executable code, a warning message may also be generated. Such a warning may notify the user that a user-defined mapping used in type inference contained incorrect information.

If the runtime environment is unable to identify the dependent code, the process may branch to termination point 542. Termination point 542 may be associated with a runtime error condition. Any suitable processing may be performed in response to such a runtime error condition, including providing a notification to a user of an error in a user-defined mapping or otherwise making an appropriate output. In some scenarios, exception handling that occurs may allow process 500 to resume for other portions of the compiled program. Accordingly, it should be appreciated that the specific error handling that occurs is not critical to the invention.

When no error occurs, or any error that occurs is correctable, the process will reach decision block 560. When processing reaches decision block 560, the process may branch, depending on whether more portions of the compiled program remain for execution. If so, the process may branch to block 562. At block 562, further byte code from the compiled program may be selected and the process may loop back to block 510, where those byte code may be executed.

Figure 6:
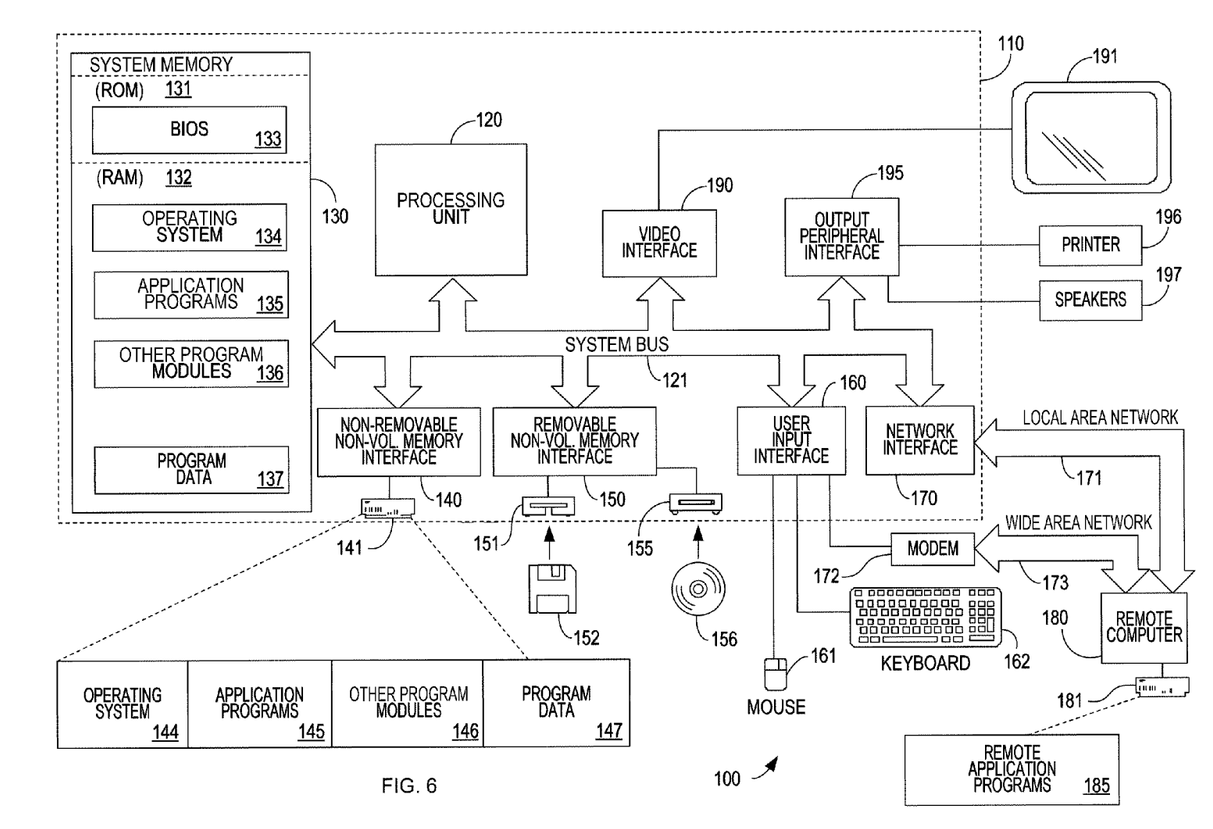
FIG. 6 is a schematic representation of a computing environment in which embodiments of the invention may operate.

The processes of FIGS. 4 and 5 may be performed in any suitable computing environment. FIG. 6 illustrates one such computing environment. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable, volatile/nonvolatile computer storage media. By way of example only, FIG. 6 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Through, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method, the computer-implemented method comprising:
    compiling a source program associated with a dynamic language, the source program having a plurality of predefined types, a plurality of user-defined types, and a plurality of methods, each method accepting input values and producing output values, the output values of a predefined type or a user-defined type;
    during compilation, for each of a plurality of portions of the source program:
        determining whether the portion comprises a method involving implicit type inference;
        when the portion comprises a method involving implicit type inference:
            determining whether the method involving implicit type inference has a user-defined element;
            when the portion comprises a method having a user-defined element:
                accessing a user-defined mapping, the user-defined mapping associating a method having a user-defined element with a set of one or more types for input values for the method to a type for each of one or more output values for the method; and
                performing the implicit type inference based on the user-defined mapping for each output value.

2. The computer-implemented method of claim 1, further comprising:
    when the portion does not comprise a method having a user-defined element:
        performing the type inference based on type-inference rules that are defined for the source language.

3. The computer-implemented method of claim 1, wherein accessing the mapping comprises accessing a data table.

4. The computer-implemented method of claim 3, wherein: the type inference is performed by a compiler; and the computer-implemented method further comprises:
    receiving user input at the compiler identifying the data table.

5. The computer-implemented method of claim 4, wherein the data table comprises a plurality of entries, each entry relating to a method and relating a set of one or more types for input values for the method to a type for each of one or more output values for the method.

6. The computer-implemented method of claim 2, wherein accessing a mapping comprises accessing a function.

7. The computer-implemented method of claim 6, wherein:
the type inference is performed by a compiler; and
the process further comprises:
receiving user input at the compiler registering the function.

8. The computer-implemented method of claim 1, further comprising:
generating compiled code based on the type inference;
when type inference is performed, inserting in the compiled code, code that, upon execution of the compiled code, verifies correctness of the inferred type.

9. The computer-implemented method of claim 1, further comprising:
identifying type inference rules based on processing the source program; and
adding the identified type inference rules to the mapping.

10. At least one non-transitory, tangible computer-readable storage medium, comprising computer-executable instructions that when executed on a processor implement a compiler for a source language, comprise:
type inference rules that perform type inference in accordance for types specified for the source language, the source language being a dynamic language, the source language including one or more methods and one or more user-defined types, each method accepting input values and producing output values, the output values of a predefined type or a user-defined type; and
a type inference engine that accesses a user-defined mapping, separate from the compiler, to perform type inference for each output value of a method having a user-defined element, the user-defined mapping associates a method with a set of one or more types for input values for the method to a type for each of one or more output values.

11. The at least one non-transitory, tangible computer-readable storage medium, of claim 10, wherein:
the method having a user-defined element is a method that receives as input a variable of user-defined type.

12. The at least one non-transitory, tangible computer-readable storage medium, of claim 10, wherein:
the method having a user-defined element is a user-defined method.

13. The at least one non-transitory, tangible computer-readable storage medium, of claim 10, wherein:
the mapping comprises a data table.

14. The at least one non-transitory, tangible computer-readable storage medium, of claim 10, wherein:
the mapping comprises a data table stored on the at least one non-transitory, tangible computer-readable storage medium.

15. The at least one non-transitory, tangible computer-readable storage medium, of claim 10, wherein:
the mapping comprises a plurality of functions stored on the at least one non-transitory, tangible computer-readable storage medium; and
the type inference engine comprises a mechanism to selectively invoke a function of the plurality of functions.

16. At least one non-transitory, tangible computer-readable storage medium, comprising computer-executable instructions that, when executed by at least one processor, comprise:
instructions for calling a method having a user-defined element that returns an output value;
instructions implementing code dependent on the returned output value;
an indication that a type of the output value was determined during compilation of a source program to produce the computer-executable instructions based on type inference using a mapping, the mapping associating a method having a user-defined element with a set of one or more types for input values for a method to a type for each of one or more output values, the source program associated with a dynamic language, the source program having a plurality of predefined types, a plurality of user-defined types, and a plurality of methods, each method accepting input values and producing output values, the output values of a predefined type or a user-defined type;
instructions for determining whether the returned output value is used consistently with the type in the code dependent on the returned output value; and
instructions for performing a corrective action when the returned output value is determined not to be used consistently with the type.

17. The at least one non-transitory, tangible computer-readable storage medium of claim 16, wherein the instructions for performing a corrective action comprise instructions for initiating a recompilation of the code dependent on the returned output value.

18. The at least one non-transitory, tangible computer-readable storage medium of claim 16, wherein the instructions for performing a corrective action comprise instructions for triggering exception processing.

19. The at least one non-transitory, tangible computer-readable storage medium of claim 16, wherein:
the code dependent on the returned output value comprises code optimized in at least one respect based on the type of the returned output value.

20. The at least one non-transitory, tangible computer-readable storage medium of claim 16, wherein:
the code dependent on the returned output value comprises code implementing a numeric operation using a sequence of steps selected based on the type of the returned output value.

* * * * *